(No Model.)

J. H. EMERY.
CRANK PIN LUBRICATING DEVICE.

No. 344,364. Patented June 29, 1886.

Witnesses.
E. Planta
Thomas F. Currier.

Inventor
J. Herbert Emery
by J. H. Adams
Attorney.

N. PETERS, Photo-Lithographer, Washington, D. C.

UNITED STATES PATENT OFFICE.

J. HERBERT EMERY, OF CHARLESTOWN, MASSACHUSETTS.

CRANK-PIN-LUBRICATING DEVICE.

SPECIFICATION forming part of Letters Patent No. 344,364, dated June 29, 1886.

Application filed September 19, 1885. Serial No. 177,520. (No model.)

*To all whom it may concern:*

Be it known that I, J. HERBERT EMERY, a citizen of the United States, residing at Charlestown, in the county of Suffolk and State of Massachusetts, have invented a new and useful Improvement in Devices for Lubricating the Crank-Pins of Steam-Engines, of which the following is a specification.

The object of my invention is to provide a convenient device for lubricating the crank-pins of steam and other engines while the engine is in motion, the lubricant being supplied by centrifugal force.

The invention consists of a hollow ring placed around the shaft and secured to the arm of the crank, a pipe passing out from the ring to a hole bored through the arm and center of the crank-pin, so that as the crank revolves the ring and pipe revolve with it, and any lubricant that is dropped into the ring will, by the centrifugal force, be thrown to the point farthest from the center of the shaft—viz., to the pitman-head.

Figure 1:
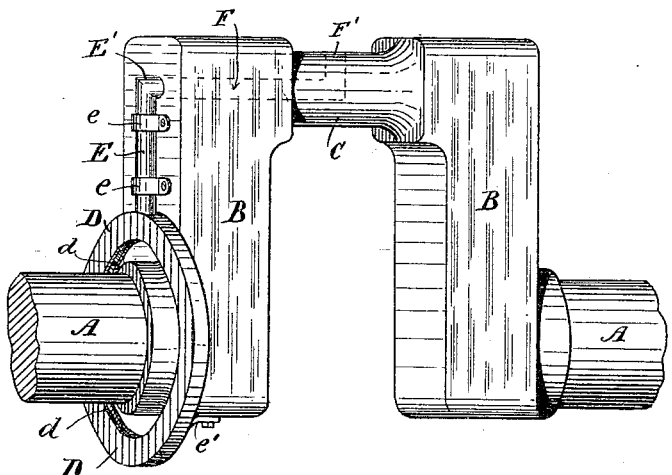
Figure 2:
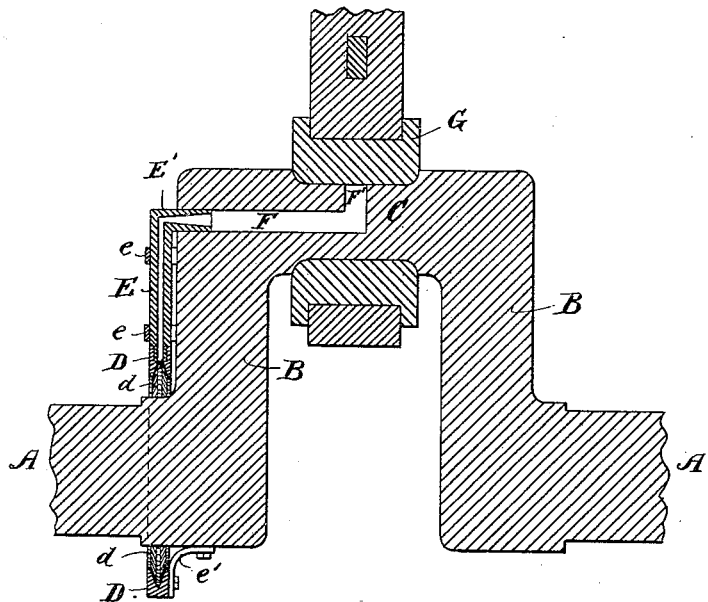
Figure 3:
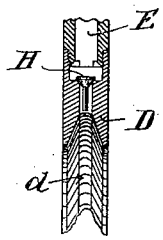

Referring to the accompanying drawings, Figure 1 is a perspective view of a crank with my invention applied thereto. Fig. 2 is a section taken through the center of the same. Fig. 3 is a sectional view of a portion of the ring and pipe with a valve for preventing the return of the lubricant.

A represents the shaft, B B the arms of the crank, and C the crank-pin.

D is a hollow ring—that is, a ring formed with a recess, $d$, on its inner side, preferably of a V-shaped form, to which is secured a pipe, E, provided at its outer end with an elbow or bend, E', that fits into an opening, F, in the arm of the crank, which opening extends through to the center of the pin C, where it communicates with a hole, F'. The ring D and pipe E are secured to the arm B of the crank by means of straps $e\ e$ and bracket $e'$, or by any other suitable means.

The operation is as follows: The ring D and pipe E having been secured in their proper position, and the crank put in motion, oil or other lubricant is dropped into the V-shaped groove $d$ in ring D, which is immediately by the centrifugal force thrown outward—that is, into the pipe E, and through the opening F to the aperture F', where the flow is stopped by coming into contact with the box of the connecting-rod G, which is thus lubricated.

Although I have described the ring D as formed with a V-shaped groove, $d$, it is obvious that any other shaped groove or recess will answer the purpose, and the ring D, instead of being formed in one piece, as shown, may be made diametrically in two parts, and united together in any suitable manner, so that the ring may be applied without removing the shaft A from its bearings, and in engines where the arm B of the crank is very long the tube or pipe E may be provided at its end nearest the ring with a valve, H, Fig. 3, to prevent any oil or other lubricant that may be in the pipe E from escaping, and, if desired, the tube E may be made telescopic, so as to adapt it to cranks of various lengths of arm.

What I claim as my invention is—

1. The combination, with a crank-pin and its arms, of a hollow or recessed ring, D, and a pipe, E, extending from the ring D, and communicating with an opening in the crank-arm, the latter being provided with an exit-opening, substantially as and for the purpose specified.

2. The combination, with the recessed ring D and the pipe E, of a valve, H, as and for the purpose set forth.

In testimony whereof I have signed my name to this specification in the presence of two subscribing witnesses.

J. HERBERT EMERY.

Witnesses:
J. H. ADAMS,
E. PLANTA.